United States Patent [19]

Yamada et al.

[11] Patent Number: 4,681,813

[45] Date of Patent: Jul. 21, 1987

[54] CERAMIC SUBSTRATE FOR A THIN LAYER MAGNETIC HEAD

[75] Inventors: Hirohide Yamada, Utsunomiya; Masahiko Sakakibara; Yoshiharu Koike, both of Kumagaya, all of Japan

[73] Assignee: Hitachi Metals, Ltd., Tokyo, Japan

[21] Appl. No.: 652,660

[22] Filed: Sep. 20, 1984

[30] Foreign Application Priority Data

Sep. 21, 1983 [JP] Japan ................................ 58-174738

[51] Int. Cl.$^4$ .............................................. G11B 5/60
[52] U.S. Cl. .................................... 428/450; 360/110; 360/122; 360/120; 360/126; 360/127; 428/471; 428/472; 428/694; 428/698; 428/900
[58] Field of Search ............... 360/120, 126, 122, 127, 360/110; 428/694, 900, 698, 471, 472, 450; 427/131, 132

[56] References Cited

U.S. PATENT DOCUMENTS

| | | | |
|---|---|---|---|
| 3,823,416 | 7/1974 | Warner | 360/122 |
| 4,251,841 | 2/1981 | Jacobs | 360/122 |
| 4,430,440 | 2/1984 | Wada | 360/122 |
| 4,443,825 | 4/1984 | Wank | 360/110 |

OTHER PUBLICATIONS

Rigby, "Thermally Conductive Ceramic Substrate for Magnetic Heads", *IBM Tech. Disc. Bull.*, vol. 25 (No. 8) Jan. 1983.

*Primary Examiner*—Ellis P. Robinson
*Attorney, Agent, or Firm*—Finnegan, Henderson, Farabow, Garrett & Dunner

[57] ABSTRACT

A thin layer magnetic head comprising a ceramic substrate consisting essentially of 100 parts by weight of a ceramic material and 0.05 to 5 parts by weight of at least one compound from the group consisting of silicon oxide and iron oxide.

6 Claims, No Drawings

CERAMIC SUBSTRATE FOR A THIN LAYER MAGNETIC HEAD

BACKGROUND OR THE INVENTION (1) Field of the Invention

This invention relates to material for non-magnetic substrates used for sliders of the magnetic heads.

(2) Description of the Prior Art

Magnetic heads used for magnetic disks ordinarily have a structure as disclosed, for example, in Japanese Patent Publication No. 57-569. In these floating type magnetic heads, a magnetic core made from a magnetic material of high permeability is fixed to the rear end portions of sliders each comprising a magnetic or non-magnetic substrate. On the lower sides of the sliders, the magnetic core has a gap for magnetic transduction. The magnetic core further has a winding for electromagnetic transduction, whereby a magnetic transducer is formed. A floating type magnetic head having such a structure is in light contact with a magnetic disk due to a spring action when the magnetic disk is stopped. When the magnetic disk is rotating, the air around the surface of the magnetic disk also moves pushing up the lower sides of magnetic head sliders.

The transducer portion of magnetic head is made, in many cases, from a soft ferrite such as Mn-Zn ferrite or Ni-Zn ferrite. When the recording density of magnetic disk is increased, it is required that the width of magnetic core and the length of the gap for magnetic transduction be made smaller, and at that time, the magnetic core is made from a magnetic thin film of permalloy or amorphous metal made by sputtering, etc. There are cases that one magnetic core is made from a soft ferrite and the other core from a magnetic thin film. When a thin film core is used a thin film of insulating material such as $Al_2O_3$ may be applied on both the thin film magnetic core and sliders to obtain electrical insulation between a winding for the electromagnetic transduction and the thin film core or between coils for electromagnetic transduction. When non-magnetic slider substrates are made from a material of relatively low electrical resistance a thin film of insulating material may be applied on the sliders to obtain insulation between the sliders and the magnetic thin film core to form a magnetic transducer.

Such a magnetic head does not contact the magnetic disk when the magnetic disk is rotating because the head is buoyant due to the flow of air. The magnetic head, however, comes in contact with the magnetic disk when the magnetic disk starts or stops rotation. For example, when the magnetic disk stops rotation, the magnetic head comes in contact with the magnetic disk as follows. As the magnetic disk reduces its rotation speed, the flow speed of the air around the surface of the magnetic disk becomes slow. When buoyancy for the magnetic head is lost, the magnetic head hits the magnetic disk. As a reaction, the magnetic head jumps up and drops on the disk again. Such a movement is repeated many times (the magnetic head appears to be dragged on the magnetic disk) and there comes a final stop. Any magnetic head must be able to withstand a shock at the start or stop of the magnetic disk and such an ability of a magnetic head at such times is called its CSS resistance (CSS stands for contact-start-stop).

In order for a magnetic head to have a superior CSS resistance property, the slider portion of the magnetic head must have excellent slidability. Further, the slider portion must be flat and free from pores and have good wear resistance.

The slider portion of magnetic head has a very complex structure as shown, for example, in Japanese Patent Laid-open No. 55-163665. In order to produce a slider of such a structure at a high productivity, the material for slider must have good machinability. Further, it is desirable that chipping of the slider material during machining be as little as possible. For this purpose, it is desirable that the slider material have crystal grain particles as small as possible.

Such a magnetic head as described above its disclosed in Japanese Patent Laid-open No. 55-163665 mentioned above. The slider of this magnetic head is made from a mixture of $Al_2O_3$ and TiC and the weight ratio of $Al_2O_3$ to TiC is in a range of 60:40 to 80:20. $Al_2O_3$-TiC ceramics have some disadvantages for example, the low density and tendency of chipping because of low affinity between $Al_2O_3$ and TiC particles. When chipped, the chips are large because of the large grain size of 4 to 5 $\mu$m.

SUMMARY OF THE INVENTION

This invention is to provide a ceramic substrate for thin film magnetic head which is hard to chip by making the relative density more than 99% through reinforcement of the bonding strength and also by making the average crystal particle diameter of about 1 $\mu$m or smaller. The ceramic substrate of this invention improves the resistance to CSS by increasing the bonding strength as aforementioned.

The ceramic substrate of this invention contains 20-55 weight % of titanium carbide as its main component, the remaining substantially consisting of aluminum oxide, and contains total 0.05-5 weight parts of silicon oxide or iron oxide to 100 weight parts of the major ceramic components.

The ceramic substrate of this invention can further contain a total of 0.05-5 weight parts of chromium oxide and/or tungsten oxide as an additive.

The titanium carbide 5-60 mol% in the major ceramic component can be substituted by carbide of zirconium, hafnium, vanadium, niobium, tantalum, chromium, molybdenum or tungsten or oxide of titanium, zirconium, hafnium, vanadium, niobium or tantalum. Further, 5-60 mol% of the aluminum oxide may be substituted by zirconium oxide. It is desirable to make the crystal structure of zirconium oxide tetragonal by forming a solid solution of magnesium oxide, calcium oxide or yttrium oxide of 2-10 mol% in the zirconium oxide.

DESCRIPTION OF PREFERRED EMBODIMENTS

In order to produce the ceramic substrate for the thin film magnetic head, the mixed form of aluminum oxide powder, titanium carbide powder and any additives is sintered in vacuum or inert gas, hot pressed or hot isostatically pressed (HIP). According to this invention, by adding silicon and/or iron oxide to the main ceramic component, the interfacial strength between the aluminum oxide particles and titanium carbide particles is increased. In the course of sintering, the silicon oxide and iron oxide react with titanium carbide or carbon of the graphite crucible to become silicon carbide and subsequently react again with the oxygen of the aluminium oxide to become silicon oxide and iron oxide, and it is considered that this repeated process activates the surface of the titanium carbide and aluminium oxide particles, thus achieving the strong bonding. Furthermore, by adding one or two of chromium and tungsten oxides together with the silicon and iron oxides, the bonding between the aluminium oxide and titanium carbide particles could be made stronger.

If the sum amount of the silicon and iron oxides is less than 0.05 weight parts in total, the addition is not effective, and if it is more than 5 weight parts, the hardness decreases, and therefore, the amount of these oxides is preferable to be the 0.05-5.0 weight parts.

If the total amount of the chromium and tungsten oxides is less than 0.05 weight parts, there is no effect of increasing the bonding strength of $Al_2O_3$ and TiC, and if it is more than 5 weight parts, the hardness decreases, and therefore, the amount of these oxides should be 0.05-5.0 weight parts.

Also, by substituting the titanium carbide of the above composition with one or more types of Zr, Hf, V, Nb, Ta, Cr, Mo, or W carbide and furthermore, with one or more types of Ti, Zr, Hf, V, Nb or Ta nitride, the sintered structure of the above composition will have micron-sized grains. These additives are not effective at less than 5 mol% of titanium carbide, and if they are more than 60 mol%, the sintering property deteriorates, and therefore, the appropriate amount is 5-60 mol%. Also, by substituting the aluminium oxide of the above composition with zirconium oxide, the aluminium oxide phase is strengthened and the resistance to chipping is improved. Especially it is effective if 2-10 mol% of one or more types of MgO, CaO and $Y_2O_3$ are dissolved in a solid solution as a stabilizer for the zirconium oxide.

The zirconium oxide does not contribute to the toughness if its added amount is less than 5 mol%, and at more than 60 mol%, the hardness is considerably decreased, and therefore, the amount of zirconium oxide is desirable to be 5-60 mol%. The amount of $Y_2O_3$, CaO and MgO is limited to 2-10 mol% because at less than 2 mol%, they are not effective for the residue of the tetragonal zirconia (residue until room temperature) which increases the toughness of $ZrO_2$ and at more than 10 mol%, the cubic phase appears to reduce the strength.

The ceramic substrate of this invention can be manufactured by the Hot press method and HIP (hot Isostatic Press) method which is used after the relative density was made more than 94% by sintering in a gas atmosphere furnace. But the most desirable method is to sinter to achieve the relative density of more than 98% by means of the hot press and then to increase the relative density to almost 100% by means of the hot isostatic press.

The ceramic substrate of this invention has a superior resistance to CSS because its relative density is very high at more than 99%, no pores of more than 1 μm nor chipping is detected and the hardness Hv is more than 2000 when measured with the load of 200 g.

EXAMPLE 1

To the aluminum oxide of purity 99.9% and average particle diameter 0.5 μm and titanium carbide of purity 99.5% and average particle diameter 0.6 μm, silicon, iron, chromium and tungsten oxide powder, 1st grade reagent, were added at the ratios shown in Table 1 and they were mixed for 24 hours with a ball mill. After drying, they were granulated and formed into the dimensions of 80 mm dia.×7-8 mm high under the pressure of 1 t/cm².

The form was set in a graphite mold and treated at 1600° C. for 1 hour in vacuum. Subsequently it was further treated at 1500° C., 1500 atmospheric pressure and in an argon atmosphere for 1 hour. The sintered form was machined into the size of 76.2 mm dia.×4 mm thick and then the one side was lapped to 0.01S (roughness less than 0.01 μm). The lapped surface was observed for pores by using a microscope and the size of the pores were measured. The relative density was calculated on basis of the size of the holes and their distribution. The sintered form was cut with a diamond blade and the dimensions of chipping caused at the edge between the lapped surface and the cut surface were measured.

Furthermore, the fractured surface was observed through a scanning type electronic microscope and the diameter of the crystal grains was measured. The results of the above measurements are shown in Table 1.

Nos. 1, 2, 3, 4, 6, 9, 13, and 16 in Table 1 are comparison examples.

No. 1 is a conventional hot-pressed product of $Al_2O_3$-TiC, and its relative density is low at 98.5%, many pores of larger than 1 μm can be found on the lapped surface, and chipping is of more than 1 μm. Nos. 2 and 3 are the products whose density was increased by adding MgO and NiO, but still the pores and chipping are large. On the other hand, the ceramics of this invention with the additives of $SiO_2$ and $Fe_2O_3$ were considerably improved in terms of pores and chipping. When only $SiO_2$ is added, No. 4 with small amount still has large pores and chippings, but in the case of No. 5 with 1% silicon oxide the relative density becomes more than 99.7% and the pores and chipping of larger than 1 μm disappear. No. 6 with 8% silicon oxide has fewer pores and chippings, but its Vickers hardness is low at 1700 while the other products have more than 2000, and therefore, it is not suited for the head substrate. In the case of $Fe_2O_3$, too, the addition of 0.05-5% improved the hardness, pores and chipping altogether.

Nos. 11-18 show the cases where $Cr_2O_3$ and/or $WO_3$ were added in addition to the $SiO_2$ and $Fe_2O_3$, and still the hardness is reduced in the case of Nos. 13 and 16 which have too much addition. In case the $Cr_2O_3$ and/or $WO_3$ were more added in comparison with the additives $SiO_2$ and $Fe_2O_3$, no chipping was found because the bonding strength between $Al_2O_3$ and TiC was further increased.

EXAMPLE 2

In addition to the mixed composition of the Example 1, samples were prepared in the same method as for the Example 1 by mixing the carbides and nitrides of Ti, Zr, Hf, V, Nb, Ta, Cr, Mo and W, and evaluated as shown in Table 2.

Nos. 1, 3, 5 and 7 in Table 2 are comparison examples.

No. 1 is a conventional hot-pressed product and its relative density is low and its particle diameter is large. If $SiO_2$ and $Fe_2O_3$ are added to it, the relative density increases but the particle diameter is still large. Nos. 3-5 are the cases where TiC was partially substituted by ZrC, but if the substituted amount is small at 4 mol%, the particle diameter is still large, 3-4 μm. On the other hand, if the substituted amount is large, like No. 4 22.5 mol% and No. 5 74.4%, the particle diameter becomes smaller than 1 μm and the effect of ZrC substitution on micronizing the crystal particles is remarkable. But if the substituted amount is too large as in the case of No. 5, even if $SiO_2$ and $Fe_2O_3$ are added, the density is reduced and therefore, it is not suitable for the substrate. In the case of No. 7, too, the crystal particles are made fine through the ZrC substitution, but because the $SiO_2$ and $Fe_2O_3$ are not added, the density is low.

Nos. 6 and 8–16 are the cases where $SiO_2$, $Fe_2O_3$, $Cr_2O_3$, and/or $WO_3$ are added and part of TiC is substituted by the nitride and carbide, and in every case, the crystal particles are of smaller than 1 μm, the relative density is high at 99.7% and no chipping and holes of more than 1 μm were found.

EXAMPLE 3

Samples were manufactured in the same method as for the Example 1 by mixing zirconium oxide and its stabilizer and the breaking strength was measured by JIS (Japanese Institute of Standards) 4-point bending test method and the relative density, etc. were also measured. The results are shown in Table 3.

Nos. 1, 2, 6 and 8 in Table 3 are comparison examples.

No. 1 is a conventional hot-pressed product and the breaking strength is low at 50 kg/cm². For No. 2 with 10% of $ZrO_2$ added, the breaking strength slightly increases, but is still low. No. 3 is a product of this invention with the additives of $SiO_2$ and $Fe_2O_3$, but the strength is still low at 50 kg/m². Nos. 4 to 10 are the cases where the amount of $ZrO_2$ and $Y_2O_3$ was changed. In every case of Nos. 4, 5, 9 and 10 where $ZrO_2$ 10% was added and the amount of $Y_2O_3$ was changed to be 0, 1, 3 and 12 mol% in $ZrO_2$, the breaking strength is increased in comparison with the cases where $ZrO_2$ was not added. But at 0 and 1 mol%, it is not so much increased (up to 60 kg/m²). On the other hand, at 3 mol%, it increased to 73 kg/m² and at 12 mol% it decreased. This is probably because, at about 3 mol%, the tetragonal $ZrO_2$ completely remain and, at 12 mol%, the cubic $ZrO_2$ exists. In the cases of Nos. 5–8 where the amount of $ZrO_2$ was changed, no increase in strength is seen in the range where the amount of $ZrO_2$ is small, and if the amount of $ZrO_2$ is large, the strength increases but the hardness decreases, and therefore, not suitable for the substrate.

Nos. 13–18 are the cases where the carbide and nitride were added and are for comparison between those which have the addition to $ZrO_2$ and those which have not. In every case, the addition of $ZrO_2$ increases the breaking strength by upto 20 kg/m², and it is clear that $ZrO_2$ improve the breaking strength.

TABLE 1

| No. | $Al_2O_3$ | TiC | Others | Relative density (%) | Vickers hardness | Existence of pore of more than 1 μm | Existence of chipping of more than 1 μm |
|---|---|---|---|---|---|---|---|
| 1 | 75 | 25 | — | 98.5 | 2000 | Yes | Yes |
| 2 | 70 | 30 | MgO: 0.5 | 98.8 | 2100 | Yes | Yes |
| 3 | 70 | 30 | MgO: 0.05 NiO: 1.0 | 99.0 | 2000 | Yes | Yes |
| 4 | 70 | 30 | $SiO_2$: 0.02 | 99.0 | 2050 | Yes | Yes |
| 5 | 70 | 30 | $SiO_2$: 1 | >99.7 | 2000 | No | No |
| 6 | 70 | 30 | $SiO_2$: 8 | >99.7 | 1700 | No | No |
| 7 | 65 | 35 | $Fe_2O_3$: 0.02 | 99.2 | 2050 | Yes | Yes |
| 8 | 65 | 35 | $Fe_2O_3$: 3 | >99.7 | 2000 | No | No |
| 9 | 65 | 35 | $Fe_2O_3$: 8 | >99.7 | 1800 | No | No |
| 10 | 70 | 30 | $SiO_2$: 2 $Fe_2O_3$: 2 | >99.7 | 2100 | No | No |
| 11 | 70 | 30 | $SiO_2$: 2 $Cr_2O_3$: 0.02 | >99.7 | 2100 | No | No |
| 12 | 70 | 30 | $SiO_2$: 2 $Cr_2O_3$: 1 | >99.7 | 2000 | No | No |
| 13 | 70 | 30 | $SiO_2$: 2 $Cr_2O_3$: 8 | >99.7 | 1800 | No | No |
| 14 | 65 | 35 | $SiO_2$: 2 $WO_3$: 0.02 | >99.7 | 2000 | No | No |
| 15 | 65 | 35 | $SiO_2$: 2 $WO_3$: 1.5 | >99.7 | 2050 | No | No |
| 16 | 65 | 35 | $SiO_2$: 2 $WO_3$: 8 | >99.7 | 1700 | No | No |
| 17 | 70 | 30 | $SiO_2$: 2 $Fe_2O_3$: 1 $WO_3$: 2 | >99.7 | 2000 | No | No |
| 18 | 70 | 30 | $SiO_2$: 2 $Fe_2O_3$: 2 $Cr_2O_3$: 2 | >99.7 | 2000 | No | No |

TABLE 2

| No. | $Al_2O_3$ | TiC | Compound (TiC substitution amount by mol % in parentheses) | Others | Relative density (%) | Particle diameter (μm) | Existence of pore of more than 1 μm | Existence of chipping more than 1 μm |
|---|---|---|---|---|---|---|---|---|
| 1 | 70 | 30 | — | MgO: 0.5 NiO: 0.5 | 99.0 | 4–5 | Yes | Yes |
| 2 | 70 | 30 | — | $SiO_2$: 2, $Fe_2O_3$: 2 | >99.7 | 4–5 | No | No |
| 3 | 70 | 28 | ZrC: 2(4) | $SiO_2$: 2 $Fe_2O_3$: 2 | >99.7 | 3–4 | No | No |
| 4 | 70 | 20 | ZrC: 10(22.5) | $SiO_2$: 2 $Fe_2O_3$: 2 | >99.7 | ≦1 | No | No |
| 5 | 70 | 5 | ZrC: 25(74.4) | $SiO_2$: 2 $Fe_2O_3$: 2 | 99.0 | ≦1 | No | No |
| 6 | 70 | 20 | ZrC: 10(22.5) | $SiO_2$: 2 $Fe_2O_3$: 2 $Cr_2O_3$: 2 | >99.7 | ≦1 | No | No |
| 7 | 70 | 20 | ZrC: 10(22.5) | MgO: 0.5 | 99.2 | ≦1 | No | No |
| 8 | 70 | 20 | VaC: 10(32.3) | $SiO_2$: 3 | ≧99.7 | ≦1 | No | No |
| 9 | 70 | 20 | TaC: 10(13.5) | $SiO_2$: 2 $Fe_2O_3$: 2 $WO_3$: 2 | >99.7 | ≦1 | No | No |
| 10 | 70 | 20 | HfC: 10(13.6) | $SiO_2$: 3 | >99.7 | ≦1 | No | No |
| 11 | 70 | 15 | TiN: 15(50.8) | $SiO_2$: 3 | >99.7 | ≦1 | No | No |
| 12 | 70 | 15 | ZrN: 15(36.4) | $SiO_2$: 5 $Fe_2O_3$: 2 $Cr_2O_3$: 2 | >99.7 | ≦1 | No | No |
| 13 | 70 | 15 | TaN: 15(23.5) | $SiO_2$: 3 $WO_3$: 2 $Fe_2O_3$: 2 | >99.7 | ≦1 | No | No |
| 14 | 70 | 10 | HfC: 10(19.6) TiN: 10(18.2) | $SiO_2$: 2 $WO_3$: 3 $Cr_2O_3$: 2 | >99.7 | ≦1 | No | No |
| 15 | 70 | 10 | ZrC: 10(22.4) TiN: 10(38.0) | $SiO_2$: 3 $Te_2O_3$: 2 | >99.7 | ≦1 | No | No |
| 16 | 70 | 15 | HfC: 10(13.8) | $SiO_2$: 1 $Fe_2O_3$: 1 $WO_3$: 2 | >99.7 | ≦1 | No | No |

TABLE 2-continued

| | Mixed composition (wt %) | | | | | | |
|---|---|---|---|---|---|---|---|
| No. | Al₂O₃ | TiC | Compound (TiC substitution amount by mol % in parentheses) | Others | Relative density (%) | Particle diameter (μm) | Existence of pore of more than 1 μm | Existence of chipping more than 1 μm |
| | | | VaC: 5(20.3) | | | | |

TABLE 3

| | Mixed composition (wt %) | | | | | |
|---|---|---|---|---|---|---|
| No. | Al₂O₃ | ZrO₂ (Al₂O₃ substitution in parentheses mol %) | Stabilizer (mol % to zirconia in parentheses) | TiC | Compound (TiC substitution in parentheses mol %) | Others |
| 1 | 70 | | | 30 | | MgO: 0.5 NiO: 1.0 |
| 2 | 60 | 10(12.1) | | 30 | | MgO: 0.5 NiO: 1.0 |
| 3 | 70 | | | 30 | | SiO₂: 2 Fe₂O₃: 2 |
| 4 | 60 | 10(12.1) | | 30 | | SiO₂: 2 Fe₂O₃: 2 |
| 5 | 60 | 10(12.1) | Y₂O₃: 0.54(3) | 30 | | SiO₂: 2 Fe₂O₃: 2 |
| 6 | 68 | 2(2.4) | Y₂O₃: 0.11(3) | 30 | | SiO₂: 2 Fe₂O₃: 2 |
| 7 | 50 | 20(24.9) | Y₂O₃: 1.1(3) | 30 | | SiO₂: 2 Fe₂O₃: 2 |
| 8 | 20 | 50(67.4) | Y₂O₃: 2.2(3) | 30 | | SiO₂: 2 Fe₂O₃: 2 |
| 9 | 60 | 10(12.1) | Y₂O₃: 0.18(1) | 30 | | SiO₂: 2 Fe₂O₃: 2 |
| 10 | 60 | 10(12.1) | Y₂O₃: 2(12) | 30 | | SiO₂: 2 Fe₂O₃: 2 |
| 11 | 70 | | | 30 | | SiO₂: 2 Fe₂O₃: 2 Cr₂O₃: 2 |
| 12 | 60 | 10(12.1) | Y₂O₃: 0.54(3) | 30 | | SiO₂: 2 Fe₂O₃: 2 Cr₂O₃: 2 |
| 13 | 70 | | | 20 | ZrC: 10(22.5) | SiO₂: 2 Fe₂O₃: 2 |
| 14 | 60 | 10(12.1) | Y₂O₃: 0.54(3) | 20 | ZrC: 10(22.5) | SiO₂: 2 Fe₂O₃: 2 |
| 15 | 70 | | | 20 | TiC: 10(13.5) | SiO₂: 2 Fe₂O₃: 2 Cr₂O₃: 2 |
| 16 | 60 | 10(12.1) | Y₂O₃: 0.54(3) | 20 | TiC: 10(13.5) | SiO₂: 2 Fe₂O₃: 2 Cr₂O₃: 2 |
| 17 | 70 | | | 20 | TiN: 10(50.5) | SiO₂: 3 |
| 18 | 60 | 10(12.1) | Y₂O₃: 0.54(3) | 20 | TiN: 10(50.8) | SiO₂: 3 |

| No. | Relative density (%) | Crystal particle diameter (μm) | Vickers hardness 200 kg | Breaking strength (kg/m²) | Existence of pore of more than 1 μm | Existence of chipping of more than 1 μm |
|---|---|---|---|---|---|---|
| 1 | 99.0 | 4–5 | 2000 | 50 | Yes | Yes |
| 2 | 99.2 | 4–5 | 1900 | 55 | Yes | Yes |
| 3 | >99.7 | ≦1 | 2100 | 50 | No | No |
| 4 | >99.7 | ≦1 | 1900 | 57 | No | No |
| 5 | >99.7 | ≦1 | 2000 | 73 | No | No |
| 6 | >99.7 | ≦1 | 2100 | 52 | No | No |
| 7 | >99.7 | ≦1 | 1900 | 75 | No | No |
| 8 | >99.7 | ≦1 | 1600 | 80 | No | No |
| 9 | >99.7 | ≦1 | 2000 | 60 | No | No |
| 10 | >99.7 | ≦1 | 2000 | 50 | No | No |
| 11 | >99.7 | ≦1 | 2000 | 50 | No | No |
| 12 | >99.7 | ≦1 | 1950 | 72 | No | No |
| 13 | >99.7 | ≦1 | 2000 | 52 | No | No |
| 14 | >99.7 | ≦1 | 1950 | 74 | No | No |
| 15 | >99.7 | ≦1 | 2050 | 50 | No | No |
| 16 | >99.7 | ≦1 | 2000 | 69 | No | No |
| 17 | >99.7 | ≦1 | 2100 | 53 | No | No |
| 18 | >99.7 | ≦1 | 1950 | 71 | No | No |

What is claimed is:

1. A thin layer magnetic head having a sintered ceramic substrate, said substrate consisting essentially of 100 weight parts of a ceramic material and 0.05 to 5 weight parts of at least one compound from the group consisting of silicon oxide and iron oxide, the ceramic material consisting essentially of 20 to 55 weight % of titanium carbide and the balance being substantially aluminum oxide.

2. The thin layer magnetic head as set forth in claim 1, wherein 5 to 60 mol % of the titanium carbide in said ceramic material is substituted by a carbide, a nitride or mixtures thereof, the carbide being at least one carbide of zirconium, hafnium, vanadium, niobium, tantalum, chromium, molybdenum and tungsten, the nitride being at least one nitride of titanium, zirconium, hafnium, vanadium, niobium and tantalum.

3. The thin layer magnetic head as set forth in claim 1 wherein said substrate further includes 0.05 to 5 weight parts of a member selected from the group consisting of chromium oxide, tungsten oxide and mixtures thereof.

4. The thin layer magnetic head as set forth in claim 2 wherein said substrate further includes 0.05 to 5 weight parts of a member selected from the group consisting of chromium oxide, tungsten oxide and mixtures thereof.

5. The thin layer magnetic head as set forth in claim 1, 2, 3 or 4, wherein 5–60 mol% of the aluminum oxide is substituted by zirconium oxide.

6. The thin layer magnetic head as set forth in claim 5, wherein the zirconium oxide contains 2 to 10 mol% of at least one member selected from the group consisting of magnesium oxide, calcium oxide and yttrium oxide in solid solution within said zirconium oxide.

* * * * *